Patented Nov. 25, 1952

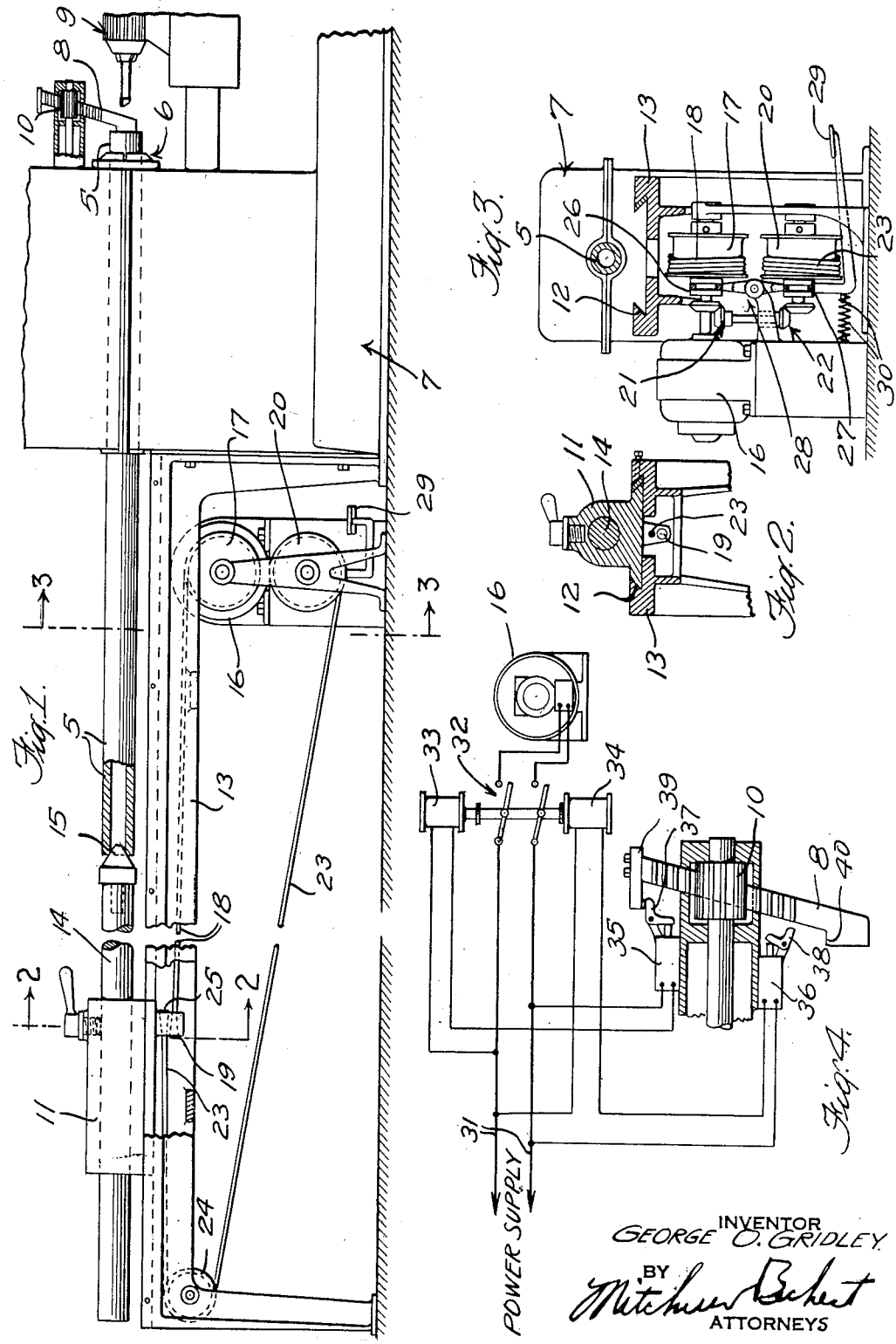

2,618,842

UNITED STATES PATENT OFFICE 2,618,842

BAR FEED MEANS

George O. Gridley, Berlin, Conn., assignor to The New Britain Machine Company, New Britain, Conn., a corporation of Connecticut Application December 20, 1947, Serial No. 793,014

3 Claims. (Cl. 29—59)

My invention relates to stock-feed means and in particular to stock-feed means for a machine having a chuck to receive internally fed stock.

It is an object of the invention to provide an improved mechanism of the character indicated.

It is another object to provide an improved electrically propelled stock-feed mechanism for a machine of the character indicated.

It is a more specific object to provide an electrically driven stock-feed mechanism that will minimize the feed-out time for a machine of the character indicated.

Other objects and various further features of the invention will be pointed out or will occur to those skilled in the art from a reading of the following specification in conjunction with the accompanying drawings. In said drawings:

Fig. 1 is a simplified side elevation showing a stock-feed mechanism of the invention, as applied to a machine to receive fed-out stock;

Fig. 2 is a fragmentary sectional view taken substantially in the plane 2—2 of Fig. 1;

Fig. 3 is a sectional view taken in the plane 3—3 of Fig. 1; and

Fig. 4 is a simplified circuit diagram illustrating a cooperative functioning according to the invention.

Briefly stated, my invention contemplates the provision of an electric drive for a stock-feed mechanism by utilizing an electric motor which will provide high stalled torques and which may withstand substantial abuse, as by sustained application of power when its rotor is stalled. In applying such a stock-feed mechanism to a machine wherein a stock stop arrests the feed to permit chucking in a desired feedout position, the stock-feed mechanism may be continuously energized. In another form, suitable switching means may connect the motor to supply full thrust before the chuck is opened and until after the feed-out motion has been arrested by the stock stop. The invention may thus provide a means of minimizing the required time for holding the chuck open, by providing full thrust prior to opening the chuck and after the chuck is closed.

Referring to the drawings, my invention is shown in application to a stock-feed mechanism for feeding a piece of stock 5 through the back end of an internally fed chuck 6 of, say, an automatic lathe 7. The lathe 7 may include a stock-stop member 8 to arrest the feed of stock 5 when the chuck 6 is open and to be retracted from stock-stopping position after the newly fed-out piece of stock has been chucked up. The lathe 7 may also include tools and tool holders, as at 9, for performing operations on the newly fed-out stock. In the case of the automatic lathe 7, stock stop 8 may be driven as by rack-and-pinion means 10 into and out of stock-stopping position in a properly timed relation with the operation of chuck 6 and with the feeding of tools such as the tool or tool holder 9.

The stock-feed mechanism for feeding the stock 5 may include a feed carriage 11 slidably supported and guided in longitudinal ways 12 in a frame 13 mounted at the rear of the machine 7. If desired, the carriage 11 may include a longitudinally adjustable work-engaging member 14, which in the form shown includes a rotatably supported conical end 15 internally to engage and axially to position the rear end of tubular stock 5.

In accordance with the invention, the feed carriage 11 may be propelled by electric motor means 16 of the so-called stalled-torque variety. In this type of motor the relatively high resistance of the motor permits relatively harmless energizing even when the rotor is locked or permitted to run at very slow speeds. Even though the rotor is locked, an energized motor may exert a high torque which may be instantly realized upon unlocking.

In the form shown, the motor 16 is fixedly mounted relatively to the frame 13 of the stock-feed mechanism and is positioned to drive a cable drum 17 supporting a cable 18, connected as at 19 to the feed carriage 11. It will be clear that, as long as the motor 16 is energized and connected to the drum 17, substantial stock-feeding forces may be constantly applied to the carriage 11, even though the chuck 6 may be closed so as in effect to lock the feed mechanism. Once, however, the chuck 6 is open, the torque constantly applied by an energized motor 16 will be immediately available to thrust the stock 5 to its feed-out position as determined by the stock 8. It will further be clear that even though the stock stop 8 may have the effect of again locking the stock-feed mechanism, the characteristics of motor 16 may be such that it will maintain its high thrust constantly while the chuck is closed and, if necessary, until the chuck is opened again for another feed-out operation. It will be understood that when the stock 5 has been consumed, that is, when the feed carriage 11 is in a fully advanced position, a switch (not shown) may be provided to shut off motor 16 while returning the feed carriage 11 (by hand, if desired) into position for feeding a new piece of stock.

In certain cases, it may be desirable to employ the motor 16 not only for stock-feed purposes as described, but also for returning the carriage 11 to the rear end of the ways 12, as when a new piece of stock 5 is to be loaded into the stock-feed mechanism. To permit this reversed propulsion in the form shown, I employ another cable drum 20 to be driven by the motor 16, as through gear trains 21—22. The drum 20 may carry a second cable 23, which may be trained over a pulley 24 at the rear of the stock-feed mechanism and fastened as at 25 to the feed carriage 11. In the form shown, I provide clutch means 26 between motor 16 and drum 17 and clutch means 27 between motor 16 and drum 20 for selectably engaging one of the drums 17—20, depending upon the propulsion desired for the feed carriage 11. A single rocking lever 28 may be pivoted between clutches 26—27 and include a treadle 29 at its actuating end; the lever 28 may include means engaging both clutches 26—27 so as to throw one of the clutches in while throwing the other out, and vice versa. If desired, spring means 30 may be employed to return the lever 28 to a normal position providing clutched-in drive for the drum 17, while the drum 20 is disengaged. In such event, it will be clear that to retract the feed carriage 11, the treadle 29 must be held down and that when the treadle is allowed to rise the carriage 11 will be urged in a forward direction.

Although the above description has implied that the motor 16 may be constantly energized, it may in certain cases be desirable to supply suitable switching means for energizing motor 16, say, just prior to unchucking and until just after chucking has been effected. Referring to Fig. 4 the motor 16 is seen to derive power from lines 31, as controlled by a relay-operated double-pole switch 32. The switch 32 includes two solenoids 33—34 for operating switch 32 in a closing direction and in an opening direction, respectively; in series with the solenoid 33 is a normally open limit switch 35, and in series with solenoid 34 is a similar switch 36. It will be clear that by momentarily closing the switch 35, as by operation of bellcrank 37, the circuit to motor 16 will be energized; and that by momentarily closing the limit switch 36, as by operation of bellcrank 38, the motor 16 may be de-energized. In the form shown, the bellcranks 37—38 are positioned for actuation by projections 39—40 on the retractable member of the stock stop 8.

It will be clear that, for the form shown, the motor 16 becomes energized when the stock stop 8 is down and in stock-stopping position, and that the motor 16 is de-energized when the stock stop 8 is up. Ordinarily, an automatic chuck, such as the chuck 6, would be open and closed only while the stock stop 8 is down, so that it will be understood that the described switching mechanism may provide the desired stock-feeding forces throughout the full period in which the chuck is open.

It will be appreciated that I have described a relatively simple stock-feed mechanism having the flexibility afforded by the use of electric power. Even though the electric-propulsion means for the feed mechanism may be stalled for substantial periods, no danger need result to the feed mechanism, and stock-feed forces may be applied to the fullest extent throughout the complete chuck-open to chuck-closed interval.

While I have described my invention in detail for the preferred form shown, it will be understood that modifications may be made within the scope of the invention as defined in the appended claims.

I claim:

1. In a machine of the character indicated, chuck means having a longitudinal internal opening to receive fed-out stock from the back and to support a part of said stock for work forward of said chuck means, retractable stock-stop means for determining a feed-out position for stock fed through said chuck means and to be retracted after each feed-out of stock, longitudinally slidable stock-feed means having a part to engage the back end of a piece of stock and to urge the same toward said chuck means, a stalled-torque motor for driving said stock-feed means, and means operatively associated with the cycle of operation of said stock-stop means for effectively connecting said motor in driving relation with said stock-feed means when said stock-stop means is in stock-stopping position and for effectively disconnecting said motor from driving relation with said stock-feed means when said stock-stop means is retracted from said position.

2. In a machine of the character indicated, chuck means having a longitudinal internal opening to receive fed-out stock from the back and to support a part of the stock for work forward of said chuck means, retractable stock-stop means for determining a feed-out position for stock fed through said chuck means and to be retracted after each feed-out of stock, longitudinally slidable stock-feed means including a stalled-torque motor and a part to engage the back end of a piece of stock for urging the same toward said chuck means, and switch means associated with said stock-stop means for energizing said motor when said stock-stop means is in stock-stopping position and for de-energizing said motor when said stock-stop means is retracted from said position.

3. A machine according to claim 2, in which said stock-feed means includes reversible drive means.

GEORGE O. GRIDLEY.

REFERENCES CITED

The following references are of record in the file of this patent:

UNITED STATES PATENTS

| Number | Name | Date |
|---|---|---|
| 760,577 | Sprong | May 24, 1904 |
| 1,678,202 | Shivers | July 24, 1928 |
| 1,846,497 | Rich | Feb. 23, 1932 |
| 2,108,274 | Tautz et al. | Feb. 15, 1938 |
| 2,343,914 | Lloyd | Mar. 14, 1944 |

FOREIGN PATENTS

| Number | Country | Date |
|---|---|---|
| 570,611 | Great Britain | July 13, 1945 |